(12) United States Patent
Tsay et al.

(10) Patent No.: US 10,838,723 B1
(45) Date of Patent: Nov. 17, 2020

(54) SPECULATIVE WRITES TO SPECIAL-PURPOSE REGISTER

(71) Applicant: Apple Inc., Cupertino, CA (US)

(72) Inventors: Christopher M. Tsay, Austin, TX (US); Conrado Blasco, Sunnyvale, CA (US); Deepankar Duggal, Sunnyvale, CA (US); Richard F. Russo, San Jose, CA (US)

(73) Assignee: Apple Inc., Cupertino, CA (US)

( * ) Notice: Subject to any disclaimer, the term of this patent is extended or adjusted under 35 U.S.C. 154(b) by 79 days.

(21) Appl. No.: 16/288,083

(22) Filed: Feb. 27, 2019

(51) Int. Cl.
*G06F 9/30* (2018.01)
*G06F 9/38* (2018.01)

(52) U.S. Cl.
CPC ........ *G06F 9/30101* (2013.01); *G06F 9/3012* (2013.01); *G06F 9/3842* (2013.01)

(58) Field of Classification Search
CPC ............................ G06F 9/3842; G06F 9/30101
See application file for complete search history.

(56) References Cited

U.S. PATENT DOCUMENTS

| 8,549,504 | B2 | 10/2013 | Breternitz, Jr. et al. |
| 9,971,713 | B2 | 5/2018 | Asaad et al. |
| 2006/0242390 | A1* | 10/2006 | Vash ..................... G06F 9/3861 712/235 |
| 2007/0113060 | A1* | 5/2007 | Lien ........................ G06F 9/384 712/244 |
| 2011/0283096 | A1* | 11/2011 | Abernathy ............... G06F 9/384 712/245 |
| 2015/0242209 | A1* | 8/2015 | Chou .................. G06F 9/30127 712/218 |
| 2016/0070576 | A1* | 3/2016 | Abernathy ............... G06F 9/384 712/214 |
| 2018/0052788 | A1 | 2/2018 | Guthrie et al. |

* cited by examiner

*Primary Examiner* — Zachary K Huson
(74) *Attorney, Agent, or Firm* — Michael B. Davis; Kowert, Hood, Munyon, Rankin & Goetzel, P.C.

(57) ABSTRACT

Techniques are disclosed relating to speculative writes to special-purpose registers (SPRs). In some embodiments, the disclosed techniques may reduce or avoid system instruction stalls while waiting for SPR writes, which may improve processor performance. In some embodiments, a processor includes a first storage element configured to store a non-speculative value of a special-purpose register and speculative storage circuitry configured to store one or more speculative values of the special-purpose register based on one or more speculatively-performed writes to the special-purpose register. In some embodiments, the processor includes control circuitry configured to: propagate the non-speculative value of the special-purpose register to control other circuitry and provide a youngest speculative value of the special-purpose register in the speculative storage circuitry as a speculative read of the special-purpose register.

20 Claims, 6 Drawing Sheets

SPECULATIVE WRITES TO SPECIAL-PURPOSE REGISTER

BACKGROUND

Technical Field

This disclosure relates generally to microprocessor architecture and more particularly to speculative writes to special-purpose registers.

Description of the Related Art

Writes to special-purpose registers such as model specific registers (MSRs), are common in certain processor workloads. For example, some workloads may write to an interrupt mask register frequently. A system reservation station may queue operations that update various system registers, e.g., in ARM-based architectures. In some implementations, MSR writes may stall execution of subsequent writes and reads to system registers until they are completed.

Figure 1:
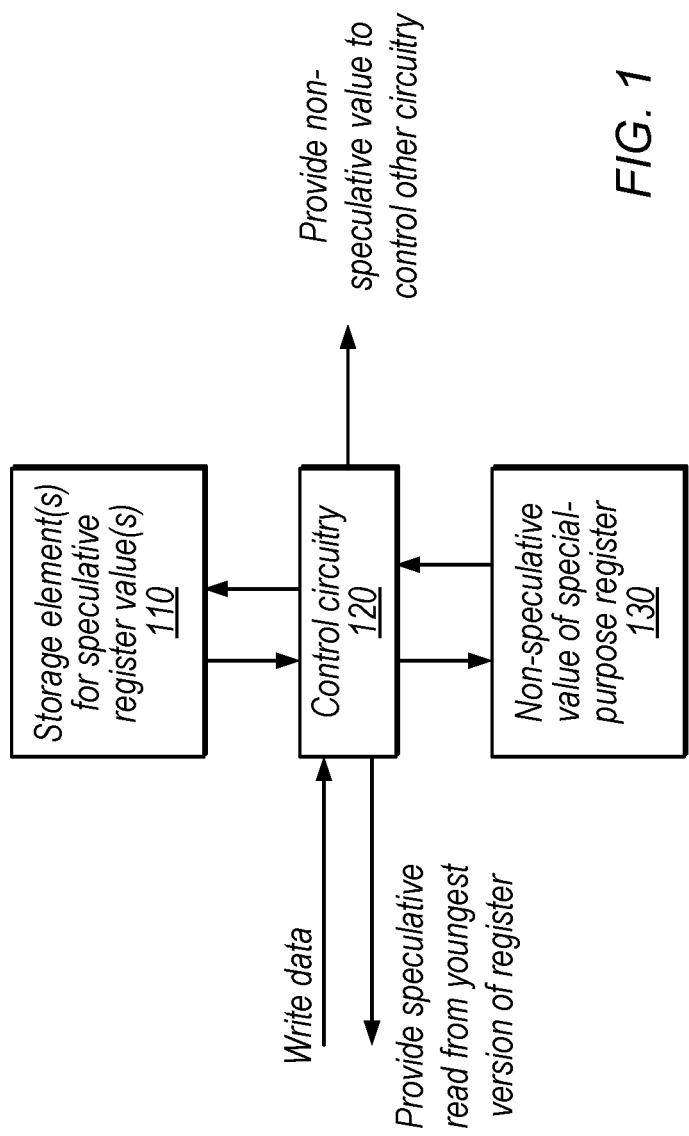
FIG. 1 is a block diagram illustrating example control circuitry configured to facilitate speculative writes to a special-purpose register, according to some embodiments.

This specification includes references to various embodiments, to indicate that the present disclosure is not intended to refer to one particular implementation, but rather a range of embodiments that fall within the spirit of the present disclosure, including the appended claims. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. "Address comparison circuitry configured to compare two addresses" is intended to cover, for example, a circuit that performs this function during operation, even if the circuit in question is not currently being used (e.g., power is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function. After appropriate programming, the FPGA may then be configured to perform that function.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

Further, as used herein, the terms "first," "second," "third," etc. do not necessarily imply an ordering (e.g., temporal) between elements. For example, a referring to a "first" graphics operation and a "second" graphics operation does not imply an ordering of the graphics operation, absent additional language constraining the temporal relationship between these operations. In short, references such as "first," "second," etc. are used as labels for ease of reference in the description and the appended claims.

DETAILED DESCRIPTION

Overview of Speculation for Special-Purpose Registers

In various embodiments, processor circuitry speculatively performs writes to a special-purpose register, which may allow other instructions that access system registers to proceed, rather than waiting on the write. In some embodiments, control circuitry provides a youngest version of the register (e.g., a youngest speculative version if it exists) for reads of the register but provides a non-speculative version to control other circuitry. For example, traditionally writes to an interrupt mask register (such as the ARM DAIF register) may stall younger system instructions until completed, but the disclosed techniques may allow speculative writes to the mask register such that younger system instructions can move forward.

FIG. 1 is a block diagram illustrating an example processor that implements speculative writes to a special-purpose register, according to some embodiments. In the illustrated embodiment, the processor includes one or more storage elements 110 to store one or more speculative register values, control circuitry 120, and a storage element 130 to store a non-speculative value of the special purpose register. Storage elements 110 and 130 may be implemented using various types of register circuitry such as edge-triggered flip-flops, for example.

Control circuitry 120, in the illustrated embodiment, is configured to receive write data and store the data in storage element(s) 110 for speculative execution while maintaining a committed value of the special purpose register in storage element 130. Speculative writes may be performed before one or more older instructions have retired and the disclosed techniques may also facilitate speculative execution of instructions that are younger than a speculatively-performed write. Speculative results may later be committed by transferring the data to storage element 130.

In the illustrated embodiment, control circuitry 120 provides speculative reads of the special-purpose register, e.g., from the youngest value in storage element(s) 110 if there are one or more speculative values. In the illustrated embodiment, control circuitry 120 is also configured to provide the non-speculative value in storage element 130 to control other circuitry. For the interrupt mask register, for example, this value may control the conditions under which other circuitry will trigger interrupts.

As used herein, the term "special-purpose register" is intended to be construed according to its well-understood meaning, which includes registers whose values control architectural state in one or more processing modes. This is in contrast to general-purpose register, for example, whose data contents may be used for various operations but do not control architectural state. Examples of special-purpose registers are registers that control or maintain exception state and registers that store processor status. The ARM system registers, as another example, include various special-purpose registers. Traditional renaming techniques may be difficult or implausible for special-purpose registers, because their contents may be propagated to control other circuitry. Some special-purpose registers are "model-specific" registers that maintain data or settings related to a particular processor implementation (and may vary among different processor generations, for example). Speaking generally, the disclosed techniques allow speculative writes for a special-purpose register while still providing non-speculative values of the special-purpose register to other circuitry affected by the register.

Figure 2:
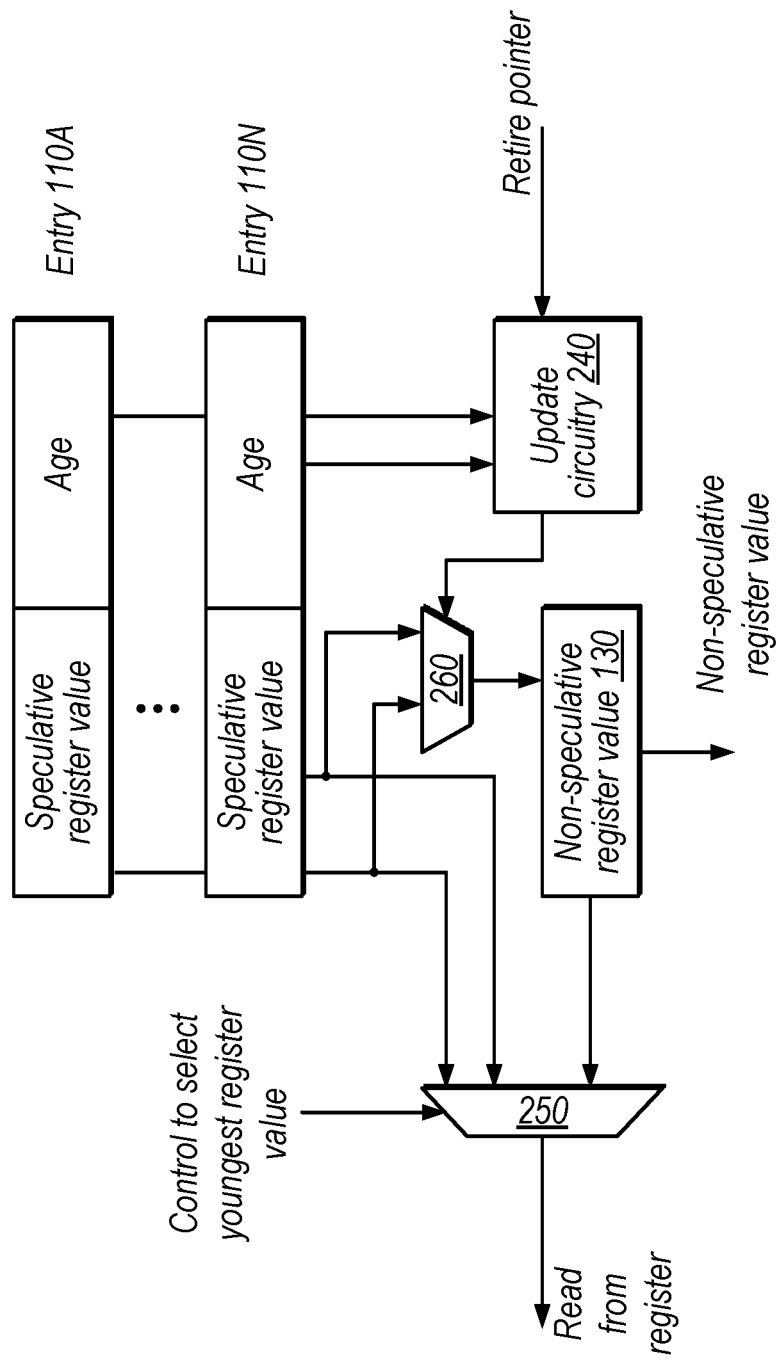
FIG. 2 is a block diagram illustrating example queue and control circuitry for speculative special-purpose register values, according to some embodiments.

FIG. 2 is a block diagram illustrating a more detailed example of queue and control circuitry, according to some embodiments. In the illustrated embodiment, a processor includes a queue with entries 110A-110N, storage element 130 for a non-speculative register value, update circuitry 240, and multiplexers (MUXes) 250 and 260.

Storage element 130 may be configured to store the non-speculative register value as discussed above with reference to FIG. 1. Entries 110A-110N, in the illustrated embodiment, are each configured to store a speculative register value and information indicating the age of the value. For example, the age may be related to a program counter value of the corresponding write instruction to the register. Various techniques may be used to determine relative ages of speculative register values, such as a shifting queue, a buffer with head or tail pointers, a field indicating whether or not each entry is the youngest, etc. In some embodiments, each entry also includes a field indicating whether the entry is valid. Entries may be invalidated in response to flushes, for example, which may also cause speculatively performed writes to the register to be replayed. In disclosed embodiments, system instructions may be dispatched and completed in program order but may be speculatively executed and may be flushed and replayed in certain situations.

Update circuitry 240, in the illustrated example, is configured to commit speculative register values to storage element 130 based on a retire pointer. For example, circuitry 240 may commit speculative results by controlling mux 260 when the retire pointer moves past their age value. Note that elements 240, 250, and 260 are an example implementation of the control circuitry 120 discussed above with reference to FIG. 1. MUX 250, in the illustrated embodiment, is controlled to select the youngest register value from among entries 110 and storage element 130 for reads from the register. In various embodiments, the control for MUX 250 is generated based on age information for valid speculative register values. Thus, reads to the register may appropriately receive a speculative value of a speculative write to the register. As shown, the non-speculative register value in storage element 130 is output to control other circuitry. The controlled circuitry may be configured to trigger interrupt or enter/return from exception handlers, for example.

In some embodiments, the processor is configured to disable further speculative writes to the register when entries 110 are full. In some embodiments, decode circuitry (not explicitly shown) may receive system commands and control circuitry may populate an entry 110 for a detected write to the register. In some embodiments, separate queues may be maintained for speculative values for different special-purpose registers. In some embodiments, the different queues may have different numbers of entries, e.g., with larger queues for special-purpose register that are expected to be written more frequently.

In various embodiments, the disclosed techniques may advantageously improve performance by allowing younger instructions to proceed rather than stalling for a write to a special-purpose register. Thus, the disclosed techniques may improve performance for system register accesses. The disclosed techniques may also improve performance for other operations. For example, for a write to a special-purpose register, followed by a read of the register and another operation (e.g., a load operation or store operation) that is dependent on the read, the read and the other operation may proceed past the speculatively-performed write.

Figure 3:
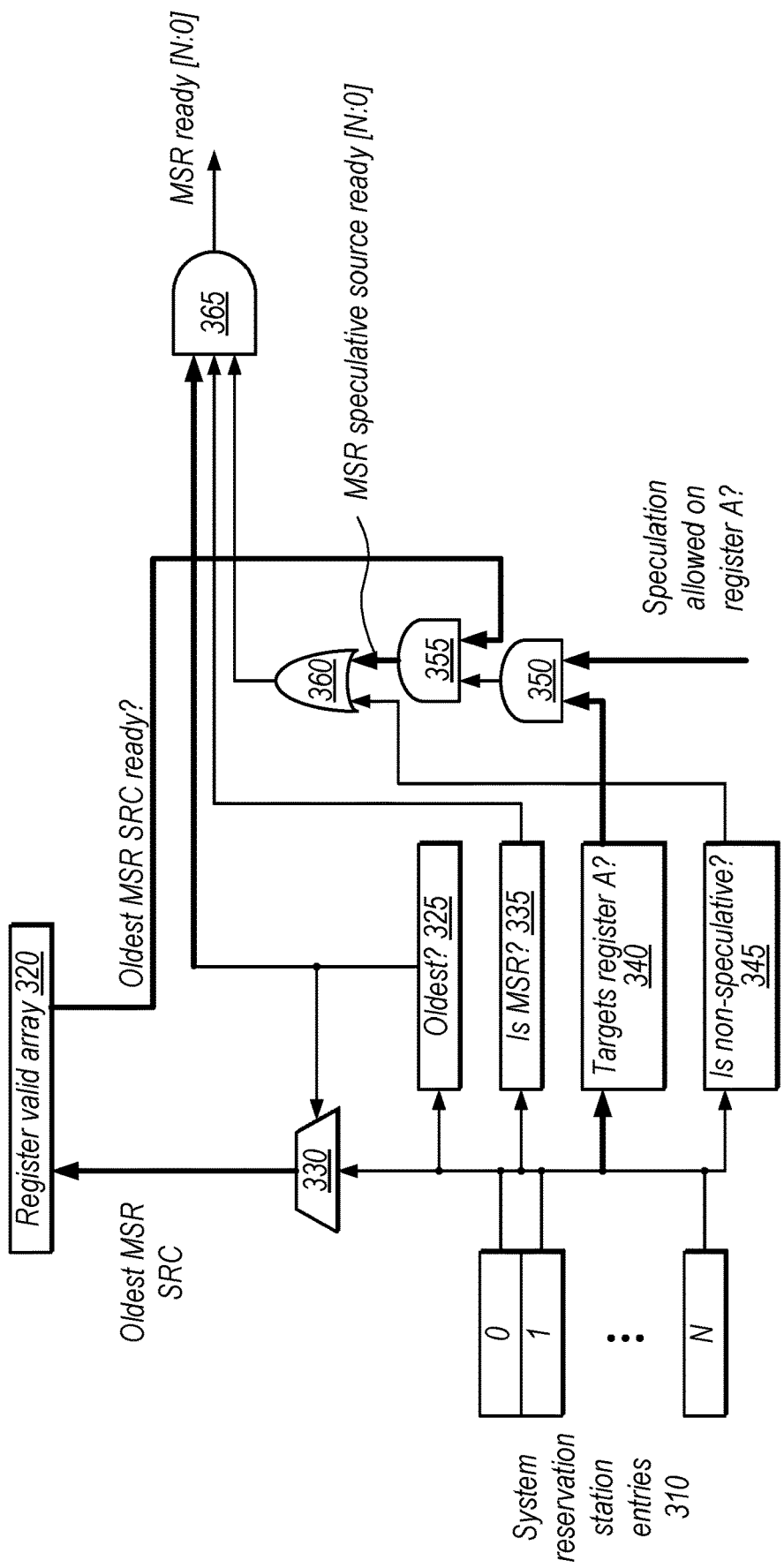
FIG. 3 is a block diagram illustrating example circuitry configured to indicate when writes to a special-purpose register are ready to be dispatched.

FIG. 3 is a block diagram illustrating example circuitry configured to determine when a write to a particular special-purpose register is ready to be dispatched, according to some embodiments. In some embodiments, the circuitry of FIG. 3 is included in map/dispatch/retire logic for a processor. In the illustrated example, a processor includes multiple system reservation station entries 310, register valid array 320, MUX 330, and control circuit elements 325, 335, 340, 345, 350, 355, 360, and 365. In the illustrated example, the lines illustrated in bold may support speculative writes to special-purpose registers (an MSR "register A," in the illustrated example).

System reservation station entries 310, in the illustrated embodiment, are configured to store system instructions that are waiting to be dispatched. For ARM embodiments, for example, these may include MRS, MSR, and ISB instructions. In the illustrated embodiment, there are N+1 reservation station entries, each of which are provided to the illustrated control circuitry. System reservation station 310 may be separately controlled from other reservation station circuitry for non-system instructions.

Circuitry 325, in the illustrated embodiment, is configured to determine the oldest system reservation station entry and control MUX 330 to identify the source for this instruction to register valid array 320. Register valid array 320 then determines whether this source is ready and sends an indication of the determination to AND gate 355. This avoids performance of a speculative MSR write before the source register providing the write data is ready, in some embodiments. Circuitry 325 also indicates the oldest entry to AND gate 365 (e.g., using a logical one in a vector with N+1 bits to indicate the oldest entry).

Circuitry 335, in the illustrated embodiment, determines whether each system reservation station entry is an MSR write and indicates this information to AND gate 365. Circuitry 340, in the illustrated embodiment, determines whether each entry targets register A and indicates this determination to AND gate 350. AND gate 350, in the illustrated embodiment, outputs a vector indicating which entries are writes to register A if speculation for register A is allowed. AND gate 355, in the illustrated embodiment, indicates whether the source for a speculative write to register A is ready, in the event that it is the oldest not-yet-dispatched MSR write. OR gate 360 outputs a corresponding logical one if the write is non-speculative (as determined by control circuitry 345) or if the write is speculative and the source is ready. AND gate 365 outputs a vector indicating a reservation station entry that writes to MSR register A whose source is ready. In some embodiments, the write can be dispatched when its corresponding bit in the output of AND gate 365 is a logical one. Note that various signals in FIG. 3 may be N+1 bit vectors and signals with a single indication may be duplicated into the N+1 bit fields, for example.

In some embodiments, the disclosed techniques may avoid a need to forward reservation station data or use a bypass network, e.g., because the register valid array indicates when the source register is available for a speculative write rather than CAMing a forwarding bypass network as in register renaming implementations for general-purpose registers. In some embodiments, performing speculative writes may allow other operations in reservation station entries to proceed, which may improve performance.

The circuitry shown in FIG. 3 is included for purposes of illustration but is not intended to limit the scope of the present disclosure. In various embodiments, other circuitry may be implemented to perform similar logical operations or other types of operations in order to determine when a write to a special-purpose register is ready to be dispatched.

Example Method

Figure 4:
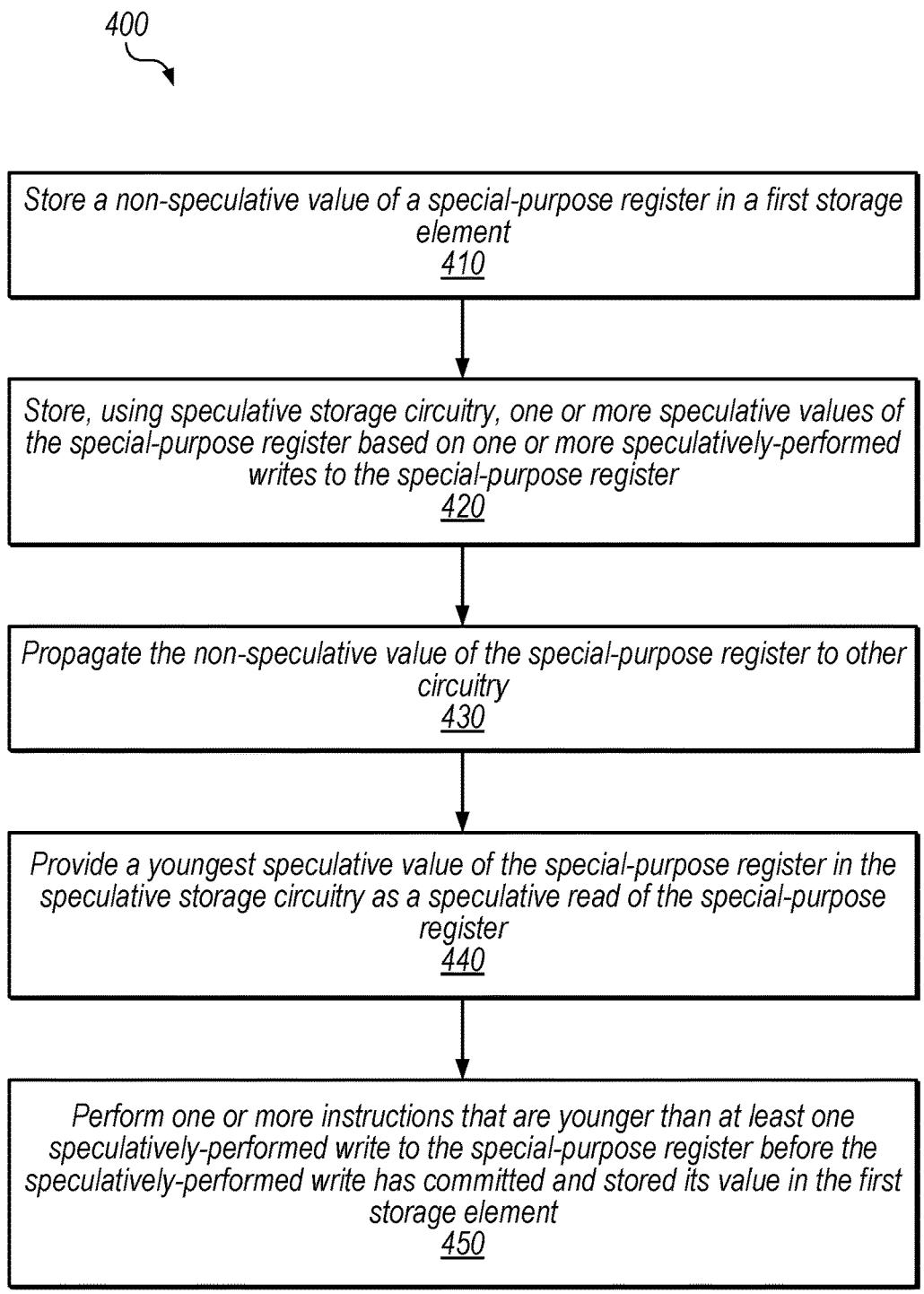
FIG. 4 is a flow diagram illustrating an example method for speculatively performing a write to a special-purpose register, according to some embodiments.

FIG. 4 is a flow diagram illustrating a method for performing a speculative write to a special-purpose register, according to some embodiments. The method shown in FIG. 4 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 410, in the illustrated embodiment, a processor stores a non-speculative value of a special-purpose register in a first storage element. In some embodiments, the special-purpose register is an interrupt mask register. In some embodiments, the special-purpose register is a model-specific register.

At 420, in the illustrated embodiment, the processor uses speculative storage circuitry to store one or more speculative values of the special-purpose register based on one or more speculatively-performed writes to the special-purpose register. In some embodiments, the speculative storage circuitry includes an age value for each entry and is configured to transfer a speculative value of the special-purpose register to the first storage element based on comparison of the retire pointer and a corresponding age value. In some embodiments, each entry in the speculative storage circuitry includes a value indicating whether the entry is the youngest speculative write to the special-purpose register.

In some embodiments, the processor includes a register valid array configured to indicate status information for general purpose registers and the processor determines, based on the register valid array, whether a source register is ready to provide data for a speculative write to the special-purpose register.

At 430, in the illustrated embodiment, the processor propagates the non-speculative value of the special-purpose register to other circuitry.

At 440, in the illustrated embodiment, the processor provides a youngest speculative value of the special-purpose register in the speculative storage circuitry as a speculative read of the special-purpose register.

At 450, in the illustrated embodiment, the processor performs one or more instructions that are younger than at least one speculatively-performed write to the special-purpose register before the speculatively-performed write has committed and stored its value in the first storage element. In some embodiments, the speculative write is performed prior to commitment of one or more instructions that are older than the speculative write.

In some embodiments, the processor includes speculative storage circuitry for a plurality of special-purpose registers. In some embodiments, the processor includes a first number of entries for speculative writes to a first special-purpose register and a different number of entries for speculative writes to a second special-purpose register (e.g., registers that are typically written more frequently may have larger queues). In some embodiments, the processor performs one or more load instructions and one or more store instructions that are younger than at least one speculatively-performed write to the special-purpose register before the speculatively-performed write has committed and stored its value in the first storage element.

Example Device

Figure 5:
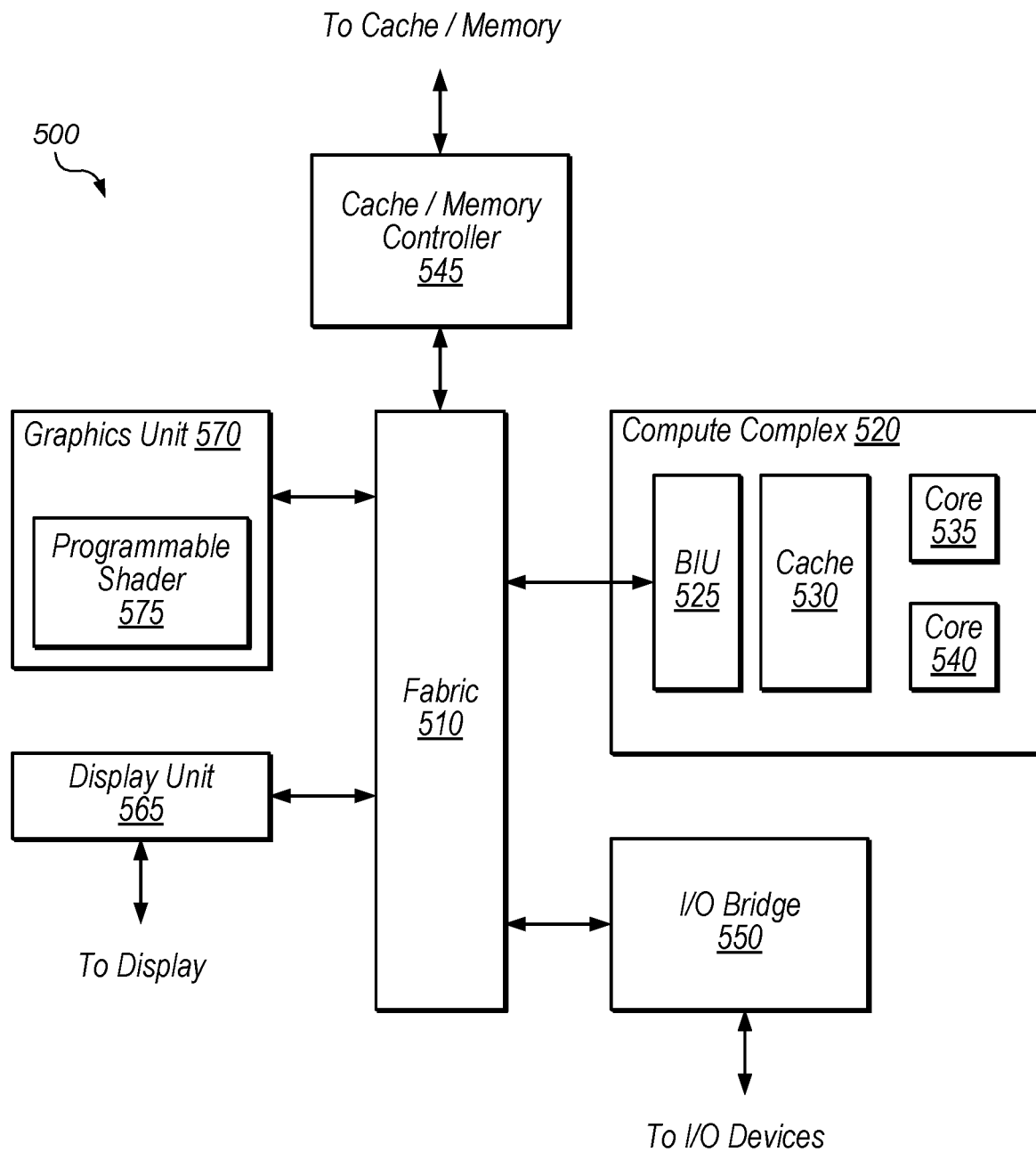
FIG. 5 is a block diagram illustrating an example computing device that includes one or more processors, according to some embodiments.

Referring now to FIG. 5, a block diagram illustrating an example embodiment of a device 500 is shown. In some embodiments, elements of device 500 may be included within a system on a chip. In some embodiments, device 500 may be included in a mobile device, which may be battery-powered. Therefore, power consumption by device 500 may be an important design consideration. In the illustrated embodiment, device 500 includes fabric 510, compute complex 520 input/output (I/O) bridge 550, cache/memory controller 545, graphics unit 570, and display unit 565. In some embodiments, device 500 may include other components (not shown) in addition to and/or in place of the illustrated components, such as video processor encoders and decoders, image processing or recognition elements, computer vision elements, etc.

The disclosed techniques may be used in various processors in various types of computing devices, such as the device shown in FIG. 5. For example, the disclosed techniques may be implemented for special-purpose registers in graphics unit 570 or cores 535 and 540.

Fabric 510 may include various interconnects, buses, MUX's, controllers, etc., and may be configured to facilitate communication between various elements of device 500. In some embodiments, portions of fabric 510 may be configured to implement various different communication protocols. In other embodiments, fabric 510 may implement a single communication protocol and elements coupled to fabric 510 may convert from the single communication protocol to other communication protocols internally.

In the illustrated embodiment, compute complex 520 includes bus interface unit (BIU) 525, cache 530, and cores 535 and 540. In various embodiments, compute complex 520 may include various numbers of processors, processor cores and/or caches. For example, compute complex 520 may include 1, 2, or 4 processor cores, or any other suitable number. In one embodiment, cache 530 is a set associative L2 cache. In some embodiments, cores 535 and/or 540 may include internal instruction and/or data caches. In some embodiments, a coherency unit (not shown) in fabric 510, cache 530, or elsewhere in device 500 may be configured to maintain coherency between various caches of device 500. BIU 525 may be configured to manage communication between compute complex 520 and other elements of device 500. Processor cores such as cores 535 and 540 may be configured to execute instructions of a particular instruction set architecture (ISA) which may include operating system instructions and user application instructions.

Cache/memory controller 545 may be configured to manage transfer of data between fabric 510 and one or more caches and/or memories. For example, cache/memory controller 545 may be coupled to an L3 cache, which may in turn be coupled to a system memory. In other embodiments, cache/memory controller 545 may be directly coupled to a memory. In some embodiments, cache/memory controller 545 may include one or more internal caches.

As used herein, the term "coupled to" may indicate one or more connections between elements, and a coupling may include intervening elements. For example, in FIG. 5, graphics unit 570 may be described as "coupled to" a memory through fabric 510 and cache/memory controller 545. In contrast, in the illustrated embodiment of FIG. 5, graphics unit 570 is "directly coupled" to fabric 510 because there are no intervening elements.

Graphics unit 570 may include one or more processors and/or one or more graphics processing units (GPU's). Graphics unit 570 may receive graphics-oriented instructions, such as OPENGL®, Metal, or DIRECT3D® instructions, for example. Graphics unit 570 may execute specialized GPU instructions or perform other operations based on the received graphics-oriented instructions. Graphics unit 570 may generally be configured to process large blocks of data in parallel and may build images in a frame buffer for output to a display. Graphics unit 570 may include transform, lighting, triangle, and/or rendering engines in one or more graphics processing pipelines. Graphics unit 570 may output pixel information for display images. In some embodiments, graphics unit 570 is configured to perform one or more of the memory consistency, mid-render compute, local image block, and/or pixel resource synchronization techniques discussed above. Programmable shader 575, in various embodiments, may include highly parallel execution cores configured to execute graphics programs, which may include pixel tasks, vertex tasks, and compute tasks (which may or may not be graphics-related).

Display unit 565 may be configured to read data from a frame buffer and provide a stream of pixel values for display. Display unit 565 may be configured as a display pipeline in some embodiments. Additionally, display unit 565 may be configured to blend multiple frames to produce an output frame. Further, display unit 565 may include one or more interfaces (e.g., MIPI® or embedded display port (eDP)) for coupling to a user display (e.g., a touchscreen or an external display).

I/O bridge 550 may include various elements configured to implement: universal serial bus (USB) communications, security, audio, and/or low-power always-on functionality, for example. I/O bridge 550 may also include interfaces such as pulse-width modulation (PWM), general-purpose input/output (GPIO), serial peripheral interface (SPI), and/or inter-integrated circuit (I2C), for example. Various types of peripherals and devices may be coupled to device 500 via I/O bridge 550.

Example Computer-Readable Medium

The present disclosure has described various example circuits in detail above. It is intended that the present disclosure cover not only embodiments that include such circuitry, but also a computer-readable storage medium that includes design information that specifies such circuitry. Accordingly, the present disclosure is intended to support claims that cover not only an apparatus that includes the disclosed circuitry, but also a storage medium that specifies the circuitry in a format that is recognized by a fabrication system configured to produce hardware (e.g., an integrated circuit) that includes the disclosed circuitry. Claims to such a storage medium are intended to cover, for example, an entity that produces a circuit design, but does not itself fabricate the design.

Figure 6:
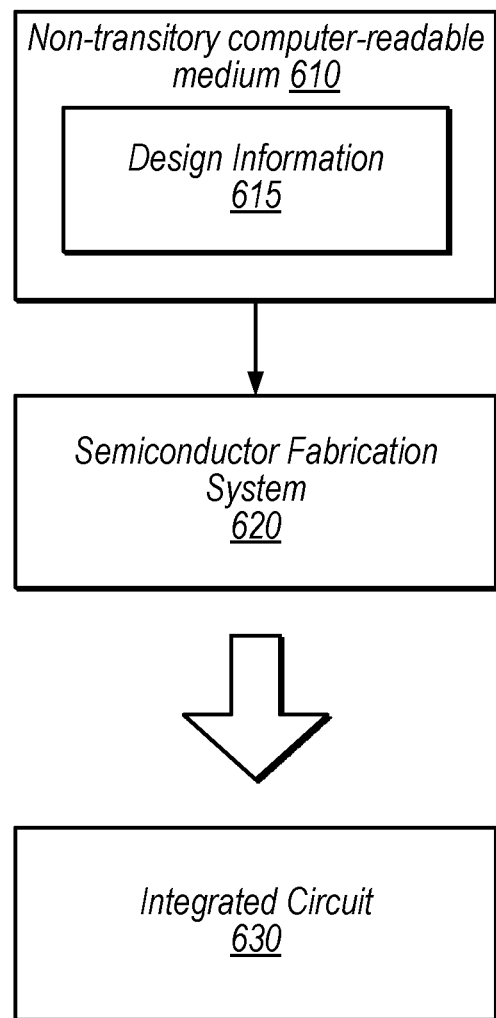
FIG. 6 is a block diagram illustrating an example computer-readable medium that stores circuit design information, according to some embodiments.

FIG. 6 is a block diagram illustrating an example non-transitory computer-readable storage medium that stores circuit design information, according to some embodiments. In the illustrated embodiment semiconductor fabrication system 620 is configured to process the design information 615 stored on non-transitory computer-readable medium 610 and fabricate integrated circuit 630 based on the design information 615.

Non-transitory computer-readable storage medium 610, may comprise any of various appropriate types of memory devices or storage devices. Non-transitory computer-readable storage medium 610 may be an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-transitory computer-readable storage medium 610 may include other types of non-transitory memory as well or combinations thereof. Non-transitory computer-readable storage medium 610 may include two or more memory mediums which may reside in different locations, e.g., in different computer systems that are connected over a network.

Design information 615 may be specified using any of various appropriate computer languages, including hardware description languages such as, without limitation: VHDL, Verilog, SystemC, SystemVerilog, RHDL, M, MyHDL, etc. Design information 615 may be usable by semiconductor fabrication system 620 to fabricate at least a portion of integrated circuit 630. The format of design information 615 may be recognized by at least one semiconductor fabrication system 620. In some embodiments, design information 615 may also include one or more cell libraries which specify the synthesis and/or layout of integrated circuit 630. In some embodiments, the design information is specified in whole or in part in the form of a netlist that specifies cell library elements and their connectivity. Design information 615, taken alone, may or may not include sufficient information for fabrication of a corresponding integrated circuit. For example, design information 615 may specify the circuit elements to be fabricated but not their physical layout. In this case, design information 615 may need to be combined with layout information to actually fabricate the specified circuitry.

Integrated circuit 630 may, in various embodiments, include one or more custom macrocells, such as memories, analog or mixed-signal circuits, and the like. In such cases, design information 615 may include information related to included macrocells. Such information may include, without limitation, schematics capture database, mask design data, behavioral models, and device or transistor level netlists. As used herein, mask design data may be formatted according to graphic data system (GDSII), or any other suitable format.

Semiconductor fabrication system 620 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 620 may also be configured to perform various testing of fabricated circuits for correct operation.

In various embodiments, integrated circuit 630 is configured to operate according to a circuit design specified by design information 615, which may include performing any of the functionality described herein. For example, integrated circuit 630 may include any of various elements shown in FIGS. 1-3, and 5. Further, integrated circuit 630 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus, comprising:
a first storage element configured to store a non-speculative value of a special-purpose register;
speculative storage circuitry configured to store one or more speculative values of the special-purpose register based on one or more speculatively-performed writes to the special-purpose register; and
control circuitry configured to:
propagate the non-speculative value of the special-purpose register to control other circuitry; and
provide a youngest speculative value of the special-purpose register in the speculative storage circuitry as a speculative read of the special-purpose register;
wherein the apparatus is configured to perform one or more instructions that are younger than at least one speculatively-performed write to the special-purpose register before the speculatively-performed write has committed and stored its value in the first storage element.

2. The apparatus of claim 1, wherein the speculative storage circuitry includes an age value for each entry and is configured to transfer a speculative value of the special-purpose register to the first storage element based on comparison of a retire pointer and a corresponding age value.

3. The apparatus of claim 1, further comprising:
a register valid array configured to indicate status information for general purpose registers; and
control circuitry configured to determine, based on the register valid array, whether a source register is ready to provide data for a speculative write to the special-purpose register.

4. The apparatus of claim 1, wherein the special-purpose register is an interrupt mask register.

5. The apparatus of claim 1, wherein the special-purpose register is a model-specific register.

6. The apparatus of claim 1, further comprising:
speculative storage circuitry for a plurality of special-purpose registers, including a first number of entries for speculative writes to a first special-purpose register and a different number of entries for speculative writes to a second special-purpose register.

7. The apparatus of claim 1, wherein the apparatus is configured to perform one or more load instructions and one or more store instructions that are younger than at least one speculatively-performed write to the special-purpose register before the speculatively-performed write has committed and stored its value in the first storage element.

8. The apparatus of claim 1, wherein each entry in the speculative storage circuitry includes a value indicating whether the entry is the youngest speculative write to the special-purpose register.

9. A method, comprising:
storing, using a first storage element, a non-speculative value of a special-purpose register;
storing, by speculative storage circuitry, one or more speculative values of the special-purpose register based on one or more speculatively-performed writes to the special-purpose register; and
propagating the non-speculative value of the special-purpose register to other circuitry;
providing a youngest speculative value of the special-purpose register in the speculative storage circuitry as a speculative read of the special-purpose register; and
performing one or more instructions that are younger than at least one speculatively-performed write to the special-purpose register before the speculatively-performed write has committed and stored its value in the first storage element.

10. The method of claim 9, further comprising:
transfer a speculative value of the special-purpose register to the first storage element based on comparison of a retire pointer and a corresponding age value.

11. The method of claim 9, further comprising:
determining, based on a register valid array, whether a source register is ready to provide data for a speculative write to the special-purpose register.

12. The method of claim 9, wherein the special-purpose register is an interrupt mask register.

13. The method of claim 9, further comprising:
storing speculative writes for a plurality of special-purpose registers, using different queue sizes for different special-purpose registers.

14. The method of claim 9, further comprising:
performing one or more load instructions and one or more store instructions that are younger than at least one speculatively-performed write to the special-purpose register before the speculatively-performed write has committed and stored its value in the first storage element.

15. A non-transitory computer readable storage medium having stored thereon design information that specifies a design of at least a portion of a hardware integrated circuit in a format recognized by a semiconductor fabrication system that is configured to use the design information to produce the circuit according to the design, including:
a first storage element configured to store a non-speculative value of a special-purpose register;
speculative storage circuitry configured to store one or more speculative values of the special-purpose register based on one or more speculatively-performed writes to the special-purpose register; and
control circuitry configured to:
propagate the non-speculative value of the special-purpose register to other circuitry; and
provide a youngest speculative value of the special-purpose register in the speculative storage circuitry as a speculative read of the special-purpose register;
wherein the circuit is configured to perform instructions that are younger than at least one speculatively-performed write to the special-purpose register before the speculatively-performed write has committed and stored its value in the first storage element.

16. The non-transitory computer readable storage medium of claim 15, wherein the speculative storage circuitry includes an age value for each entry and is configured to transfer a speculative value of the special-purpose register to the first storage element based on comparison of a retire pointer and a corresponding age value.

17. The non-transitory computer readable storage medium of claim 15, wherein the design information further specifies that the circuit includes:
a register valid array configured to indicate status information for general purpose registers; and
control circuitry configured to determine, based on the register valid array, whether a source register is ready to provide data for a speculative write to the special-purpose register.

18. The non-transitory computer readable storage medium of claim 15, wherein the special-purpose register is an interrupt mask register.

19. The non-transitory computer readable storage medium of claim 15, wherein the design information further specifies that the circuit includes:
speculative storage circuitry for a plurality of special-purpose registers, including a first number of entries for speculative writes to a first special-purpose register and a different number of entries for speculative writes to a second special-purpose register.

20. The non-transitory computer readable storage medium of claim 15, wherein the circuit is configured to perform one or more load instructions and one or more store instructions that are younger than at least one speculatively-performed write to the special-purpose register before the speculatively-performed write has committed and stored its value in the first storage element.

* * * * *